(12) United States Patent
Cloos et al.

(10) Patent No.: US 10,018,162 B2
(45) Date of Patent: Jul. 10, 2018

(54) DRIVING DEVICE FOR DRIVING A VEHICLE AS WELL AS METHOD AND COMPUTER PROGRAM PRODUCT FOR OPERATING THIS DRIVING DEVICE

(71) Applicant: GM GLOBAL TECHNOLOGY OPERATIONS LLC, Detroit, MI (US)

(72) Inventors: Lutz Kilian Cloos, Ruesselsheim (DE); Claus Juergen Glahn, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 43 days.

(21) Appl. No.: 15/204,390

(22) Filed: Jul. 7, 2016

(65) Prior Publication Data

US 2017/0009709 A1 Jan. 12, 2017

(30) Foreign Application Priority Data

Jul. 7, 2015 (DE) .................. 10 2015 008 736

(51) Int. Cl.
*F02M 26/00* (2016.01)
*F02M 26/26* (2016.01)
(Continued)

(52) U.S. Cl.
CPC .......... *F02M 26/26* (2016.02); *F02D 41/005* (2013.01); *F02D 41/0072* (2013.01);
(Continued)

(58) Field of Classification Search
CPC ........ F02M 26/13; F02M 26/22; F02M 26/23; F02M 26/25; F02M 26/30; F02D 41/0047
See application file for complete search history.

(56) References Cited

U.S. PATENT DOCUMENTS 5,617,726 A * 4/1997 Sheridan ............... F02B 37/007
123/568.12
8,949,004 B2 * 2/2015 Ishigami ............. F02D 41/0005
123/568.21
(Continued)

FOREIGN PATENT DOCUMENTS

DE  1020050252496 A1  5/2007
DE   102007057603 A1  6/2009
(Continued)

OTHER PUBLICATIONS

German Patent Office, German Search Report for German Application No. 102015008736.3, dated Dec. 30, 2015.

*Primary Examiner* — Thomas Moulis
(74) *Attorney, Agent, or Firm* — Lorenz & Kopf, LLP

(57) ABSTRACT

A driving device for driving a vehicle includes an internal combustion engine, a feed line for feeding combustion air to the internal combustion engine, a discharge line for discharging exhaust gases from the internal combustion engine, a charge air cooler that is arranged in the feed line for cooling the combustion air, and a recirculation line branching off the discharge line for recirculating the exhaust gas from the discharge line into the feed line. The recirculation line includes a bypass line that the exhaust gas can be fed to the internal combustion engine through the charge air cooler and/or bypassing the charge air cooler.

15 Claims, 4 Drawing Sheets

(51) Int. Cl.
 F02M 35/10 (2006.01)
 F02D 41/00 (2006.01)
 F02D 41/14 (2006.01)
 F02M 26/05 (2016.01)

(52) U.S. Cl.
 CPC ... *F02D 41/0077* (2013.01); *F02M 35/10222* (2013.01); *F02D 41/0007* (2013.01); *F02D 41/145* (2013.01); *F02D 2200/0408* (2013.01); *F02M 26/05* (2016.02); *Y02T 10/47* (2013.01)

(56) References Cited

U.S. PATENT DOCUMENTS

| | | | |
|---|---|---|---|
| 9,670,855 B2* | 6/2017 | Dickson | F02D 41/0215 |
| 2007/0186536 A1 | 8/2007 | Hashizume | |
| 2008/0149078 A1 | 6/2008 | Hill et al. | |
| 2009/0050117 A1* | 2/2009 | Tai | F02B 29/0412 |
| | | | 123/542 |
| 2010/0043428 A1* | 2/2010 | Stablein | F01N 3/025 |
| | | | 60/602 |
| 2012/0124992 A1* | 5/2012 | Fiveland | F01N 5/02 |
| | | | 60/599 |
| 2013/0000618 A1* | 1/2013 | Groenendijk | F02D 13/0276 |
| | | | 123/568.12 |
| 2013/0111898 A1* | 5/2013 | Dale | F02M 25/0706 |
| | | | 60/599 |
| 2014/0190161 A1 | 7/2014 | Hayashi | |
| 2014/0318513 A1* | 10/2014 | Kovac | F02B 29/0475 |
| | | | 123/568.12 |
| 2015/0047340 A1* | 2/2015 | Ulrey | F02B 47/08 |
| | | | 60/600 |
| 2015/0128907 A1* | 5/2015 | Redon | F02B 75/12 |
| | | | 123/46 R |
| 2016/0177881 A1* | 6/2016 | Wicks | F02M 35/10268 |
| | | | 123/568.12 |
| 2017/0276096 A1* | 9/2017 | Fischer | F02M 26/35 |

FOREIGN PATENT DOCUMENTS

| | | |
|---|---|---|
| FR | 2847004 B1 | 7/2005 |
| JP | 2002310007 A | 10/2002 |
| JP | 2007315173 A | 12/2007 |

\* cited by examiner

DRIVING DEVICE FOR DRIVING A VEHICLE AS WELL AS METHOD AND COMPUTER PROGRAM PRODUCT FOR OPERATING THIS DRIVING DEVICE

CROSS-REFERENCE TO RELATED APPLICATION

This application claims priority to German Patent Application No. 102015008736.3, filed Jul. 7, 2015, which is incorporated herein by reference in its entirety.

TECHNICAL FIELD

The present disclosure pertains to a driving device for driving a vehicle and to a method and a computer program for operating this driving device, as well as a vehicle the driving device of which is operated with this computer program product.

BACKGROUND

During the course of efforts of keeping emissions that are liberated during the operation of internal combustion engines as low as possible, the so-called exhaust gas recirculation plays an important part for improving the thermal efficiency of the internal combustion engine. In principle, a high-pressure exhaust gas recirculation and a low-pressure exhaust gas recirculation are distinguished. In case that the internal combustion engine is supercharged, i.e. the driving device includes a compressor such as a turbocharger, the exhaust gas recirculation can take place in the regions of the feed line and discharge line, in which the combustion air and the exhaust gas are still compressed, i.e. are under a pressure above atmospheric pressure. This constitutes a high-pressure exhaust gas circulation. If the exhaust gas recirculation is recirculated outside these regions, a low-pressure exhaust gas recirculation is present. In case of naturally aspirated internal combustion engines, exclusively a low-pressure exhaust gas recirculation takes place. Such driving devices with a high-pressure exhaust gas recirculation are known from US 2007/0186536 A1 and DE 603 20 574 T2.

In particular for utilizing the high-pressure exhaust gas recirculation a positive pressure gradient is necessary. The pressure of the exhaust gas in the discharge line before the exhaust gas turbine has to be greater than the pressure of the combustion air or of the mixture of combustion air and recirculated exhaust gas in the feed line. Otherwise, the recirculated exhaust gas has to be delivered into the feed line with the help of a delivery unit such as a pump, which requires an additional component and leads to an increase of the fuel consumption.

In case of internal combustion engines in which the combustion air is supercharged by means of a turbocharger, a negative pressure differential is present in the region of low rotational speeds and high loads. In other words, the pressure in the feed line is greater than in the discharge line in front of the exhaust gas turbine. In this region, the high-pressure exhaust gas recirculation can therefore not be employed without an additional delivery unit. Only from rotational speeds of the internal combustion engine of approximately 3,000 rpm does the pressure in the discharge line in front of the exhaust gas turbine become greater than the pressure in the feed line, so that the exhaust gas recirculation can then be employed.

In the region of the rated output, the high-pressure exhaust gas recirculation causes the temperature of the mixture of combustion air and recirculated exhaust gas to significantly rise, which results in clear disadvantages with respect to the fuel consumption.

In particular, in the feed line of internal combustion engines, the combustion air of which is compressed by means of a turbocharger, a charge air cooler is usually arranged in flow direction of the combustion air to the internal combustion engine downstream of the turbocharger in order to again offset the heating of the combustion air caused by the compression among other things for the aforementioned reasons. The aim is to have a combustion air temperature of 35° C. However, the charge air cooler causes a dynamic stagnation pressure and thus a pressure increase upstream of the charge air cooler in the feed line. When the exhaust gas is introduced into the feed line upstream of the charge air cooler the temperature of the mixture of combustion air and recirculated exhaust gas can be lowered but the driving pressure gradient, because of the dynamic stagnation pressure of the charge air cooler, is lower, which is why a high-pressure exhaust gas recirculation can only be employed at significantly higher rotational speeds.

SUMMARY

The present disclosure provides a driving device for driving a vehicle, with which the exhaust gas device can be employed in a wider rotational speed range of the internal combustion engine. According to an embodiment of the present disclosure, the driving device includes an internal combustion engine, a feed line for feeding combustion air to the internal combustion engine, a discharge line for discharging exhaust gases from the internal combustion engine, a charge air cooler arranged in the feed line for cooling the combustion air, a recirculation line branching off the discharge line for recirculating the exhaust gas from the discharge line into the feed line. Through the recirculation line, exhaust gases are feedable to the internal combustion engine through the charge air cooler, and through a bypass line exhaust gases are feedable to the internal combustion engine while bypassing the charge air cooler.

The essence of the driving device is that the recirculation line at a first inlet in flow direction of the combustion air to the internal combustion engine leads into the feed line upstream of the charge air cooler and a bypass line is provided, which at a second inlet between the charge air cooler and the internal combustion engine leads into the feed line. There is thus the possibility, depending on whether a driving pressure gradient is present between the discharge line and the feed line in front of or behind the charge air cooler, to recirculate the exhaust gas into the feed line in front of or behind the charge air cooler.

When the exhaust gas is introduced into the feed line in front of the charge air cooler, the temperature of the mixture of combustion air and recirculated exhaust gas can be lowered, as a result of which the thermal efficiency of the internal combustion engine is increased. In addition, the combustion position of the combustion center of gravity and consequently also the quietness of operation of the internal combustion engine can also be improved as a consequence of a reduced knocking tendency, but the pressure in the feed line in front of the charge air cooler is reduced through the dynamic stagnation pressure of the charge air cooler, which is why a high-pressure exhaust gas recirculation can only be employed at significantly higher rotational speeds and loads.

When the exhaust gas is introduced into the feed line behind the charge air cooler, the required driving pressure gradient already materializes at lower rotational speeds and loads since the dynamic stagnation pressure of the charge air cooler ceases to apply. But the recirculated exhaust gas is fed to the combustion air uncooled, so that the temperature of the mixtures of combustion air and recirculated exhaust gas fed to the internal combustion engine increases, which in comparison to a recirculation in front of the charge air cooler results in a deterioration of the thermal efficiency and consequently an increase of the fuel consumption as a consequence.

Through the driving device it is possible, depending on prevailing pressure conditions, to recirculate the exhaust gas into the feed line in front of or behind the charge air cooler. Because of the dynamic stagnation pressure of the charge air cooler, a driving pressure gradient is more likely to form behind the charge air cooler than in front of the charge air cooler. Thus, the exhaust gas can initially be introduced into the feed line behind the charge air cooler. Even when the temperature of the combustion air increases because of this, the abovementioned advantages of the exhaust gas recirculation compared with an omitted exhaust gas recirculation are at least partially attained. With increasing rotational speeds and loads, the pressure in the discharge line increases so that from a certain point a driving pressure gradient is present also in front of the charge air cooler. The exhaust gas is then introduced into the feed line in front of the charge air cooler so that the mixture of exhaust gas and combustion air flows through the charge air cooler and is cooled. Because of this, the abovementioned advantages of the exhaust gas recirculation such as the improved thermal efficiency and the improved quietness of operation are attained in full.

In a further embodiment, the bypass line communicates with the return line. The driving device includes a shut-off and directional control device interacting with the recirculation line for shutting off the recirculation line or conducting the recirculated exhaust gas through the charge air cooler and/or, bypassing the charge air cooler, to the internal combustion engine. In this case, the bypass line branches off the recirculation line and not off the discharge line. When the pressure differential between the exhaust gas pressure, which is present between the internal combustion engine and the exhaust gas turbine, and the pressure in the feed line both in front of and also behind the charge air cooler is negative, the shut-off and directional control device is shut off with increasing rotational speed and increasing load of the internal combustion engine, the pressure downstream of the internal combustion engine in the discharge line will increase.

Because of the dynamic stagnation pressure of the charge air cooler described above, the pressure differential between the exhaust gas pressure and the pressure in the feed line between the charge air cooler and the internal combustion engine will become more quickly positive with increasing rotational speed and load than the pressure differential between the exhaust gas pressure and the pressure in the feed line upstream of the charge air cooler. As soon as the pressure differential between the pressure in the discharge line in front of the exhaust gas turbine and the pressure in the feed line between the charge air cooler and the internal combustion engine becomes positive, the shut-off and directional control device is switched so that the exhaust gas is introduced into the feed line downstream of the charge air cooler.

When the rotational speed and/or the load of the internal combustion engine are further increased, the exhaust gas pressure increases further so that the pressure differential from the exhaust gas pressure and the pressure upstream of the charge air cooler likewise becomes positive. As soon as this is the case, the shut-off and directional control device is switched so that the exhaust gas is introduced into the feed line upstream of the charge air cooler. The shut-off and directional control device contributes to control the exhaust gas recirculation depending on rotational speed and load and the pressures that are present in the feed line and the discharge line because of this so that the advantages of the exhaust gas recirculation can be employed in full without a delivery unit being required.

In a further configuration, the shut-off and directional control device includes an actuating device, which can be put into two or more switching positions, in order to conduct the recirculated exhaust gas through the charge air cooler and/or to the internal combustion engine bypassing the charge air cooler. The actuating device in this case can be configured for example as a three-way valve or as a flap. Because of this it is possible to use frequently used components of simple construction, as a result of which the additional expenditure in terms of the design and production as well as the costs connected with this can be kept low.

A further development is characterized in that the driving device includes a flow rate regulating device interacting with the recirculation line for adjusting the flow rate of the recirculated exhaust gas. The flow rate of the recirculated exhaust gas has to be matched to the respective operational status of the internal combustion engine so that the abovementioned advantages can be realized in full. In particular when an excessive flow rate of exhaust gas is recirculated, an opposite negative effect can be achieved which can be prevented by means of the flow rate regulating device. In particular, the flow rate of the recirculated exhaust gas has an influence on the temperature of the mixture of exhaust gas and combustion air. In addition, the flow rate regulating device can change the flow rate of the recirculated exhaust gas dependent on the current operational status of the driving device and on the position of the shut-off and directional control device, so that the above advantages can be realized in full.

In a further development, the driving device includes a recirculation cooler arranged in the recirculation line for cooling the recirculated exhaust gas. As already mentioned efforts are made to lower the temperature of the mixture of exhaust gas and combustion air fed to the internal combustion engine as far as possible. By means of the recirculation cooler the exhaust gas can be cooled even before entering the feed line, so that the temperature of the mixture of exhaust gas and combustion air can be further reduced and the thermal efficiency of the internal combustion engine further increased.

In a further design, the driving device includes a turbocharger with a turbo compressor arranged in the feed line for compressing the combustion air and an exhaust gas turbine arranged in the discharge line for driving the turbocharger. The power of the internal combustion engine can be increased by means of the turbocharger in that because of the compression a greater flow rate of combustion air can be fed to the internal combustion engine.

A further design of the driving device is characterized in that the recirculation line leads into the feed line or into the charge air cooler at a first inlet and the turbo compressor, seen in flow direction of the combustion air to the internal combustion engine, is arranged upstream of the first inlet, and the recirculation line branches off the discharge line at a branch-off point and the exhaust gas turbine in flow direction of the exhaust gas away from the internal combustion engine is arranged downstream of the branch-off point.

It is appropriate for the bypass line to be in fluid communication with the recirculation line. The first inlet, at which the recirculation line leads into the feed line, is located, seen in flow direction of the combustion air towards the internal combustion engine, in front of the charge air cooler or in the charge air cooler, wherein in both cases the combustion air and the recirculated exhaust gas has to flow entirely or at least partially through the charge air cooler, as a result of which the combustion air and the recirculated exhaust gas are cooled. In this case, a high-pressure exhaust gas recirculation is realized since because of the arrangement of the branch-off point, at which the recirculation line branches off the discharge line, the recirculated exhaust gas in front of the exhaust gas turbine has not yet been expanded and is conducted into the already pre-compressed combustion air. Cooling with a high-pressure exhaust gas recirculation is particularly effective since during the compression the combustion air is heated. Through the cooling, the volume of the mixture of recirculated exhaust gas and combustion air is reduced, so that a greater mass of the mixture can be fed to the internal combustion engine, as a result of which its thermal efficiency is increased.

Furthermore, a throttle valve is arranged between the charge air cooler and the internal combustion engine, wherein the bypass line leads into the feed line at a second inlet and the second inlet is arranged either between the charge air cooler and the throttle valve or between the throttle valve and the internal combustion engine. As already described, the bypass line includes two ends, the second inlet being located in the region of the second end. The throttle valve serves for changing the flow rate of the combustion air flowing through the feed line to the internal combustion engine, as a result of which the load of the internal combustion engine is changed. Depending on the position of the throttle valve, the pressure upstream and downstream of the throttle valve is changed. In particular when the second inlet leads into the feed line downstream of the throttle valve can the pressure gradient be increased by means of a suitable adjustment of the throttle valve so that the exhaust gas recirculation can already be employed at lower rotational speeds and lower loads.

In a further configuration, the driving device includes a control unit that the shut-off and directional control device is activatable in such a manner that as a function of the current operational status of the driving device the recirculation line is shut off or the recirculated exhaust gas conducted through the charge air cooler and/or conducted to the internal combustion engine bypassing the charge air cooler. The current operational status of the driving device can be determined by a status sensor device. The control unit ensures that the exhaust gas recirculation is optimally carried out depending on the present operational status. To this end, the present operational status is determined by means of the status sensor device, which includes suitable sensors for detecting the current operational status and the shut-off and directional control device suitably activated. The abovementioned advantages of the exhaust gas recirculation can be optimally attained in this way.

Here, the status sensor device includes at least one pressure sensor arranged in the feed line and/or in the discharge line for measuring the pressure in the feed line and/or in the discharge line and/or at least one mass flow measuring unit for measuring the mass flow of the combustion air or the exhaust gas flowing through the feed line and/or the discharge line and/or at least one tachometer for measuring the rotational speed of the internal combustion engine. A tachometer is part of the standard equipment of any vehicle with internal combustion engine. It is generally possible to determine the current operational status and in particular the current pressure conditions in the feed and discharge line by way of tests as a function of the rotational speed and store the same in a control unit so that the shut-off and directional control device is switched exclusively as a function of the rotational speeds of the internal combustion engine. However, the tests that are necessary for this purpose are relatively elaborate and thus expensive. Furthermore, changes in the duct system can occur over the course of time for example through soot deposits, which lead to changes of the pressure conditions in the feed and discharge line. In this case, the shut-off and directional control device is no longer optimally activated.

The provision of a pressure sensor for determining the pressure at least at one place, for example in the feed line, creates the possibility of detecting the pressure conditions that are actually present and to be able to activate the shut-off and directional control device accordingly. The provision of such a pressure sensor consequently contributes towards the optimal operation of the driving device and to reliably implement the mentioned advantages and technical effects. In many cases, a pressure sensor is provided at the inlet valve of the internal combustion engine anyway so that it is obvious to use the signals generated by this pressure sensor in the activating of the shut-off and directional control device. Then, the additional design effort compared with conventional driving devices is particularly low.

In addition to this, a mass flow measuring unit for determining the mass flow of the combustion air respectively the exhaust gas flowing through the feed line and the discharge line can be arranged in the feed line and/or in the discharge line. The use of the term "respectively" serves to indicate that the mass flow measurement measures either the combustion air or the exhaust gas depending on the arrangement. When the mass flow measuring unit is arranged in the feed line, it measures the mass flow of the combustion air, wherein this is to include also the case that a part of the exhaust gas is admixed to the combustion air via the exhaust gas recirculation. When the mass flow measuring unit is arranged in the discharge line it measures the mass flow of the exhaust gas. The mass flow can also be used in order to provide information regarding the current operational status and in particular regarding the pressure conditions in the driving device. Accordingly, the mass flow measuring unit makes a contribution towards switching the shut-off and directional control device at the optimal time so that the abovementioned advantages can be preferably realized in full.

The status sensor device can include further sensors, which supply data relevant for describing the current operational status of the driving device. Accordingly, temperature sensors for determining the temperature in the feed or discharge line can be provided.

As mentioned at the outset, the pressure conditions in the feed line and in the discharge line mainly depend on the load and thus also on the rotational speed. In this regard it is possible to activate the shut-off and directional control device exclusively by way of the rotational speed of the internal combustion engine that is present at the moment, but for the purpose of which relatively elaborate tests for determining the pressure conditions in the feed and discharge line as a function of the rotational speed are necessary. However, this makes it possible to completely omit a pressure sensor arranged in the feed or discharge line and/or a mass flow measuring unit arranged in the feed or discharge line. However, when a pressure sensor and a mass flow measuring unit are present, continuously updated characteristic maps can be stored in the control unit so that in the event that the pressure sensor and/or the mass flow measuring unit should fail, the shut-off and directional control device is at least temporarily switched exclusively by way of the rotational speed of the internal combustion engine without departing too far from the optimal operating range of the driving device.

A further aspect relates to a method for operating a driving device according to any one of the previously mentioned exemplary embodiments for driving a vehicle. In accordance with this method, the current operational status of the driving device is determined and corresponding status signals are generated by the status sensor device. The status signals are communicated to the control unit. Either a first pressure in the feed line seen in flow direction of the combustion air to the internal combustion engine upstream of the charge air cooler or a second pressure in the feed line downstream of the charge air cooler and an exhaust gas pressure in the discharge line is determined by the control unit taking into account the status signals. The first pressure or the second pressure is compared with the exhaust gas pressure. The shut-off and directional control device are activated by the control unit in such a manner that the shut-off and directional control device shuts off the recirculation line when the first pressure or the second pressure is greater than the exhaust gas pressure.

The activation of the shut-off and directional control device in this embodiment is very simple since the status sensor device only has to be equipped so that the case whether the first pressure or the second pressure in the feed line is smaller or greater than the exhaust gas pressure has to be examined. Thus, only two pressures are determined. It is sufficient to determine only the first or the second pressure by way of the signals generated by the status sensor device, since the first pressure is greater or at best equal to the second pressure. The technical effects and advantages that are obtained in addition to this correspond to those which have been explained for the driving device according to the present disclosure. The first pressure can be determined by calculation and/or by measurement. Likewise, the second pressure can be determined by calculation and/or by measurement.

A further aspect relates to a method for operating a driving device according to any one of the previously explained embodiments for driving a vehicle. Accordingly, the current operational status of the driving device is determined and corresponding status signals are generated by the status sensor device. The status signals are communicated to the control unit. Either a first pressure in the feed line seen in flow direction of the combustion air to the internal combustion engine upstream of the charge air cooler or a second pressure in the feed line downstream of the charge air cooler and an exhaust gas pressure in the discharge line are determined by the control unit taking into account the status signals. The first pressure and/or the second pressure are compared with the exhaust gas pressure. The shut-off and directional control device are activated by the control unit in such a manner that either the shut-off and/or directional control device shuts off the recirculation line when the first pressure or the second pressure are greater than the exhaust gas pressure, or the shut-off and/or directional control device conducts the recirculated exhaust gas to the internal combustion engine bypassing the charge air cooler when the exhaust gas pressure is greater than the second pressure, or the shut-off and/or directional control device conducts the recirculated exhaust gas through the charge air cooler to the internal combustion engine when the exhaust gas pressure is greater than the first pressure.

In this embodiment, both the first pressure and also the second pressure are determined. This can be affected for example in that the pressure loss caused by the charge air cooler is deducted from the first pressure as a function of the current rotational speed in order to calculate the second pressure. Thus, it can be assumed based on the pressure loss brought about by the charge air cooler that the second pressure is lower than the first pressure. In this regard, the shut-off and directional control device is actuated from the shut off position so that it initially conducts the exhaust gas into the feed line bypassing the charge air cooler, when the second pressure is lower than the first pressure, as soon as the second pressure is lower than the exhaust gas pressure. Only in particular when the first pressure is also lower than the exhaust gas pressure will the exhaust gas be conducted through the first sub-line. The other way around the information that the second pressure is greater than the exhaust gas pressure is sufficient in order to shut off the shut-off and directional control device since the first pressure is then also greater than the exhaust gas pressure.

The first pressure can be determined by calculation and/or by measurement. Likewise, the second pressure can be determined by calculation and/or by measurement.

In a further configuration, the method for operating a driving device includes measuring the first pressure in the feed line between the turbo compressor and the charge air cooler or the second pressure in the feed line between the throttle valve and the internal combustion engine with a pressure sensor and generating corresponding pressure signals. The second pressure and/or the first pressure and the exhaust gas pressure between the internal combustion engine and the exhaust gas turbine are compared by the control unit taking into account the pressure signals. The first pressure or the second pressure is compared with the exhaust gas pressure. The shut-off and directional control devices are controlled with the control unit in such a manner that the shut-off and/or directional control device shuts off the recirculation line when the first pressure or the second pressure is greater than the exhaust gas pressure.

Only one pressure sensor is needed, which measures either the first pressure upstream of the charge air cooler or the second pressure downstream of the charge air cooler. That one of the two pressures that is not measured is calculated by means of the control unit, for example in that the pressure loss generated by the charge air cooler is added to the second pressure or deducted from the first pressure. In addition, the exhaust gas pressure is calculated. The shut-off and directional control device is shut off when the second pressure is greater than the exhaust gas pressure.

A further embodiment of the method according to the present disclosure provides determining the current operational status of the driving device by measuring the mass flow of the combustion air or of the exhaust gas flowing through the feed line and/or discharge line by means of a mass flow measuring unit, and/or measuring the rotational speed of the internal combustion engine by means of a tachometer, and/or measuring the first pressure and/or the second pressure by means of one or more pressure sensors suitably arranged in the feed line.

It is true in principle that the pressure conditions in the feed and the discharge line can be better detected the more sensors included in the status sensor device. Because of this it is possible to largely realize the advantages of the exhaust gas recirculation. In addition, a redundancy can be created for the event that one of the sensors should fail. Generally, the driving device can be operated the better the more accurate the currently prevailing pressure conditions are known. In this regard, a pressure sensor each can be provided for determining the first pressure, the second pressure and the exhaust gas pressure. Each calculation can approximate the currently prevailing pressure conditions only more or less accurately. Influences of the pressure conditions as a result of unforeseen events such as a soot deposit in the feed and/or discharge line cannot be taken into account with a calculation, while the pressure sensors indicate such influences. In this regard, the accuracy of the activation of the shut-off and directional control device with regard to an optimal operation of the driving device is increased with each further pressure sensor, however the number of components and consequently complexity of the driving device are increased because of this, which leads to an increase in weight and a more elaborate and expensive production of the driving device. Here, a balance between the desired accuracy of the operation and the effort required for this purpose should be aimed at.

However, when a pressure sensor and/or a mass flow measuring unit are/is present, continuously updated characteristic maps can be stored in the control unit so that in the event that the pressure sensor and/or the mass flow measuring unit should fail, the shut-off and directional control device can be switched at least temporarily exclusively by way of the rotational speed of the internal combustion engine, without departing too far from the optimal operating range of the driving device. In this regard, by taking into account the rotational speed signals in determining the exhaust gas pressure and the first and/or of the second pressure (depending on which of the two pressures is not measured by means of a pressure sensor) a redundancy is created in case that the pressure sensor and/or the mass flow measuring unit should fail. In addition, the pressure conditions can be tracked as a function of the rotational speed and the realizations gained from this used for future simulations and for configuring future driving devices.

The endeavor according to the present disclosure is to introduce the exhaust gas into the feed line upstream of the charge air cooler as soon as a driving pressure gradient is also present there. For it is then possible to cool the mixture of the aspirated combustion air and recirculated exhaust gas by means of the charge air cooler and not only the combustion air itself. Although the recirculated exhaust gas can likewise be cooled by means of the recirculation cooler, the exhaust gases however have a significantly higher temperature than the combustion air aspirated from the surroundings. In practice, the recirculation cooler cannot cool the recirculated exhaust gases significantly to below 95° C., whereas the combustion air can be cooled to a temperature range between 35 and 45° C. without major effort. Accordingly, when the recirculated exhaust gases are introduced into the feed line upstream of the charge air cooler, they are cooled both in the recirculation cooler and also in the charge air cooler. By lowering the temperature the knocking tendency (tendency towards self-ignition of the mixture after the firing point through local mixture heating as a consequence of the pressure increase during the combustion of the ignited mixture) in spark-ignition engines is reduced, as a result of which in particular the pistons and the cylinder head are treated with care. In addition, the quietness of operation can be improved by the possibility of the advanced ignition.

Control means in terms of the present disclosure, for example the control unit, the pressure sensor, the mass flow measuring unit or/and the tachometer, can each by themselves or jointly be formed as hardware and/or software, for example as computer program or computer program module.

The control unit, the pressure sensor, the mass flow measuring unit or/and the tachometer can each by themselves or jointly include in particular a digital processing unit, which preferentially includes a microprocessor unit (CPU). The CPU can be data or/and signal connected to a storage system or/and bus system. The control unit, the pressure sensor, the mass flow measuring unit and/or the tachometer can each by themselves or jointly include one or more programs or program modules. The digital processing unit can be designed in such a manner that commands which are implemented as a program stored in a storage system are executed, input signals from a data bus system are received or/and output signals to a data bus system are output. A storage system can include one or more in particular different storage media. The storage media can in particular be optical, magnetic, solid-state or/and other preferentially non-volatile storage media.

A control system of the driving device in terms of the embodiments described above can include control systems in the form of hardware or/and software, which can also be understood as function module architecture. Such a function module architecture includes at least one function block, so that the control system is comparable to the driving device of a device, which includes means for carrying out the method described above. Here, the at least one means of the device corresponds to the mentioned function block.

A further aspect relates to a computer program product for operating a driving device according to any one of the configurations described above with a program code, which is stored on a readable medium, in order to carry out an embodiment of a method according to any one of the embodiments described above. The advantages and technical effects that can be achieved with the computer program product according to the present disclosure correspond to those which have been explained for the methods according to the present disclosure.

In addition to this, the present disclosure provides a vehicle which includes a driving device according to any one of the previously described exemplary embodiments and is operated with a previously explained method or a previously described computer program product. The advantages and technical effects, which can be achieved with the vehicle according to the present disclosure, correspond to those that have been explained for the driving device according to the present disclosure, the methods according to the present disclosure and the computer program product according to the present disclosure. In particular, it is mentioned in summary that according to the present disclosure the exhaust gas recirculation compared with known driving devices can be employed even at lower rotational speeds and lower loads so that the advantages of the exhaust gas recirculation such as the improvement of the thermal efficiency and the reduction of the knocking tendency can be realized to a fuller extent than has been known up to now.

A further embodiment of the present disclosure relates to a control unit and a control and/or regulating device with a computer program product according to any one of the previously described embodiments. With the control unit and with the control and/or regulating device it is possible, as with the computer program product, to improve the thermal efficiency and reduce the knocking tendency.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
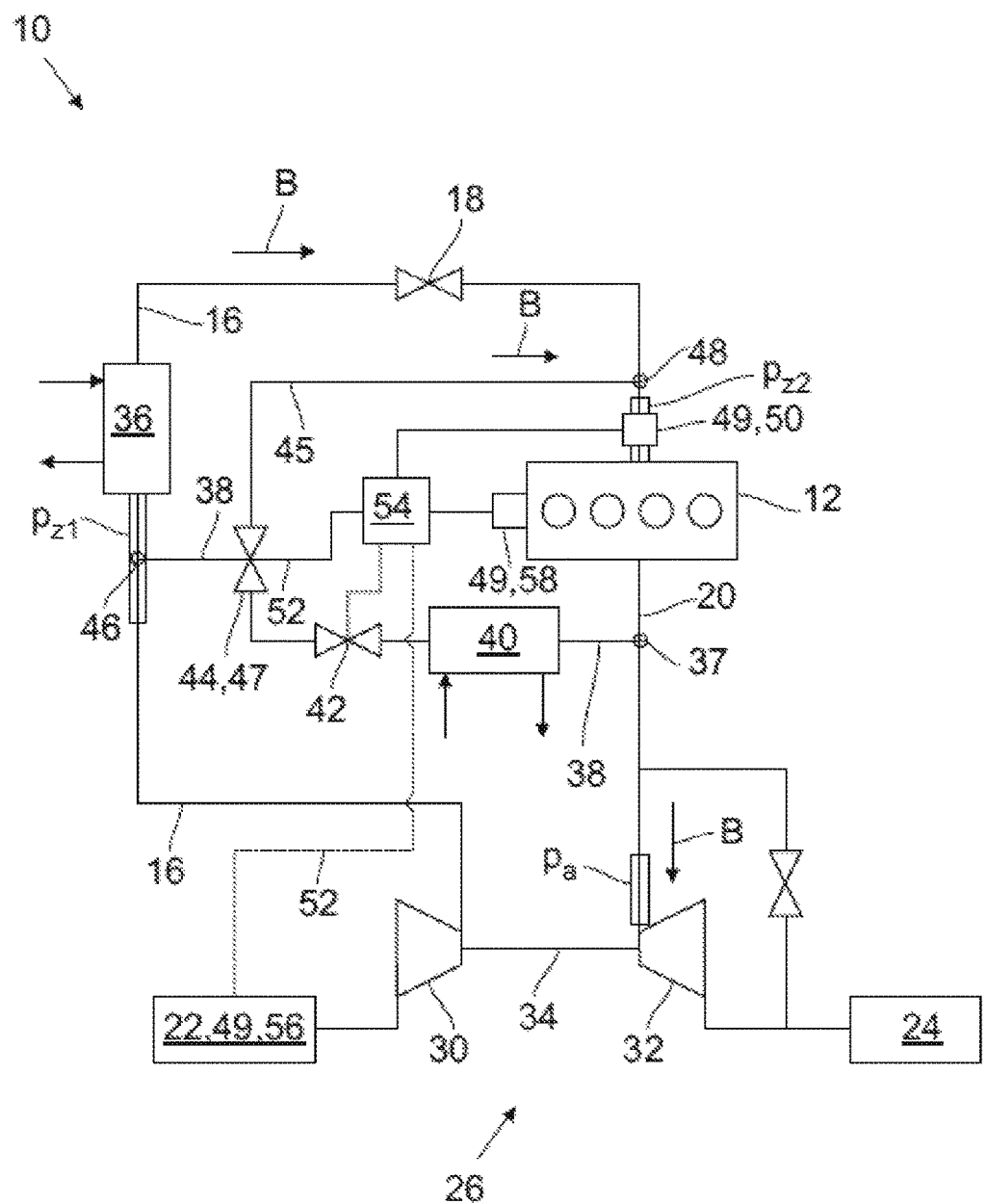
FIG. 1 is a diagram of an exemplary embodiment of a driving device according to the present disclosure.

In FIG. 1, a driving device 10 according to the present disclosure for driving a vehicle which is not shown is shown by way of a diagram. The driving device 10 according to the present disclosure includes an internal combustion engine 12, for example a four-cylinder spark-ignition or diesel engine, which provides the power needed for driving the vehicle. The internal combustion engine 12 usually operates according to the four-stroke principle, while a two-stroke principal is also conceivable. The driving device 10 includes a feed line 16, with which the internal combustion engine 12 can be supplied with combustion air. In the feed line 16, a throttle valve 18 is arranged, with which the load of the internal combustion engine 12 can be changed. The exhaust gases which are created during the combustion of the mixture of combustion air and fuel are discharged from the internal combustion engine 12 by way of a discharge line 20.

For aspirating the combustion air from the surroundings, the internal combustion engine 12 can include an aspiration device 22, which for example can include an air filter. The discharge line 20 includes an exhaust gas treatment system 24, which can include catalytic converters which are not shown in more detail, in order to convert toxic components contained in the exhaust gas into non-toxic compounds.

The driving device 10 includes a turbocharger 26, which includes a turbo compressor 30 arranged in the feed line 16 and an exhaust gas turbine 32 arranged in the discharge line 20, which are connected to one another by means of a shaft 34. Between the turbo compressor 30 and the throttle valve 18 a charge air cooler is arranged, with which the compressed combustion air can be cooled.

At a branch off point 37 between the internal combustion engine 12 and the exhaust gas turbine 32, a recirculation line 38 branches off the discharge line 20, with which exhaust gas from the discharge line 20 can be introduced back into the feed line 16. In the recirculation line 38, a recirculation cooler 40 is arranged with which the recirculated exhaust gases can be cooled. Downstream of the recirculation cooler 40 a regulating valve 42 is arranged with which the flow rate of the recirculated exhaust gas can be changed. The recirculation line 38 leads into the feed line 16 at a first inlet 46, wherein the inlet 46 is arranged between the turbo compressor 30 and the charge air cooler 36. The case in which the first inlet 46 is directly arranged on the charge air cooler 36 and in particular at the upstream inlet of the charge air cooler is not shown.

Downstream of the regulating valve 42, a shut-off and directional control device 44 is arranged in which a bypass line 45 branches off the recirculation line 38. In the shown example, the shut-off and directional control device is embodied as a three-way valve 47. Furthermore, the bypass line 45 includes a second inlet 48 which is arranged between the throttle valve 18 and the internal combustion engine 12, so that the bypass line 45 leads into the feed line 16 downstream of the charge air cooler 36.

In addition, the driving device 10 includes a status sensor device 49, which in the shown example includes a pressure sensor 50 which is arranged directly in front of the internal combustion engine 12, for example in front of inlet valves of an inlet manifold which is not shown here for determining a second pressure $p_{z2}$ of the combustion air or the mixture of combustion air and recirculated exhaust gas between the charge air cooler 36 and the internal combustion engine 12. The pressure sensor 50 generates pressure signals corresponding to the determined second pressure $p_{z2}$ and conducts these on to a control unit 54 via electrical lines 52.

In addition to this, the status sensor device 49 includes a mass flow measuring unit 56 with which the mass flow of the combustion air flowing through the feed line 16 can be determined. The mass flow measuring unit 56 generates corresponding mass flow signals and feeds these to the control unit 54. In the shown example, the mass flow measuring unit 56 is arranged in the suction device 22, i.e. in the inlet region, in which the combustion air is aspirated from the surroundings.

The flow direction of the combustion air and of the exhaust gases through the driving device 10 is marked by the arrows B. The designations "upstream" and "downstream" relate to this flow direction.

Furthermore, the status sensor device 49 includes a tachometer 58 which measures the rotational speed of the internal combustion engine 12 converting it into corresponding rotational speed signals.

The driving device 10 according to the present disclosure is operated in the following manner: as soon as the internal combustion engine 12 is started. The pressure sensor 50 measures the second pressure $p_{z2}$ and converts the measured second pressure into corresponding pressure signals. Furthermore, the mass flow of the combustion air, which is sucked into the feed line 16 via the suction device 22, is determined with the mass flow measuring unit 56 which converts the mass flow into corresponding mass flow signals. In addition to this, the tachometer 58 measures the current rotational speed of the internal combustion engine 12 and converts the measured rotational speed into corresponding rotational speed signals.

By way of the electrical lines 52, the pressure signals which are provided by the status sensor device 49, the mass flow signals and the rotational speed signals are fed to the control unit 54 which out of the pressure signals, the mass flow signals and/or the rotational speed signals determines a first pressure $p_{z1}$ and an exhaust pressure $p_a$ using the characteristic maps already mentioned above and compares the first and the second pressure $p_{z1}$, $p_{z2}$ with the exhaust gas pressure $p_a$. In case that both the first pressure $p_{z1}$ and second pressure $p_{z2}$ are greater than the exhaust gas pressure $p_a$ there is no driving pressure gradient from the discharge line 20 to the feed line 16. Consequently it is not possible either to recirculate the exhaust gas from the discharge line 20 into the feed line 16 without the help of a delivery unit. Accordingly, the shut-off and directional control device 44 is activated by the control unit 54 so that it completely shuts off the recirculation line 38. In this case, no exhaust gas is recirculated from the discharge line 20 into the recirculation line 38.

In case that the control unit 54 based on the second pressure $p_{z2}$ determined by the status sensor device 49 and in particular by the pressure sensor 50 calculates that the exhaust gas pressure $p_a$ is greater than the second pressure $p_{z2}$, but smaller than the first pressure $p_{z1}$, the control unit 54 activates the shut-off and directional control device 44 so that the exhaust gas is recirculated into the feed line 16 downstream of the charge air cooler by way of the bypass line 45 and the second inlet 48. Depending on how much greater the exhaust gas pressure $p_a$ is compared with the second pressure $p_{z2}$, the control unit 54 additionally activates the regulating valve 42 accordingly so that the optimal flow rate of the exhaust gas is recirculated in order to be able to optimally operate the internal combustion engine 12 in particular with respect to the thermal efficiency and the quietness of operation.

In case that the control unit 54 determines based on the second pressure $p_{z2}$ measured by the pressure sensor 50, the mass flow of the sucked-in combustion air measured by the mass flow measuring unit 56 and/or the rotational speed of the internal combustion engine 12 measured by the tachometer 58 that the exhaust gas pressure $p_a$ is not only greater than the second pressure $p_{z2}$ but also greater than the first pressure $p_{z1}$, the control unit activates the shut-off and directional control device 44 so that the recirculated exhaust gas is recirculated into the feed line 16 upstream of the charge air cooler 36 via the first inlet 46 of the recirculation line 38.

In both cases, the control unit activates the regulating valve 42 so that the optimal flow rate of the recirculated gas is recirculated.

Figure 2:
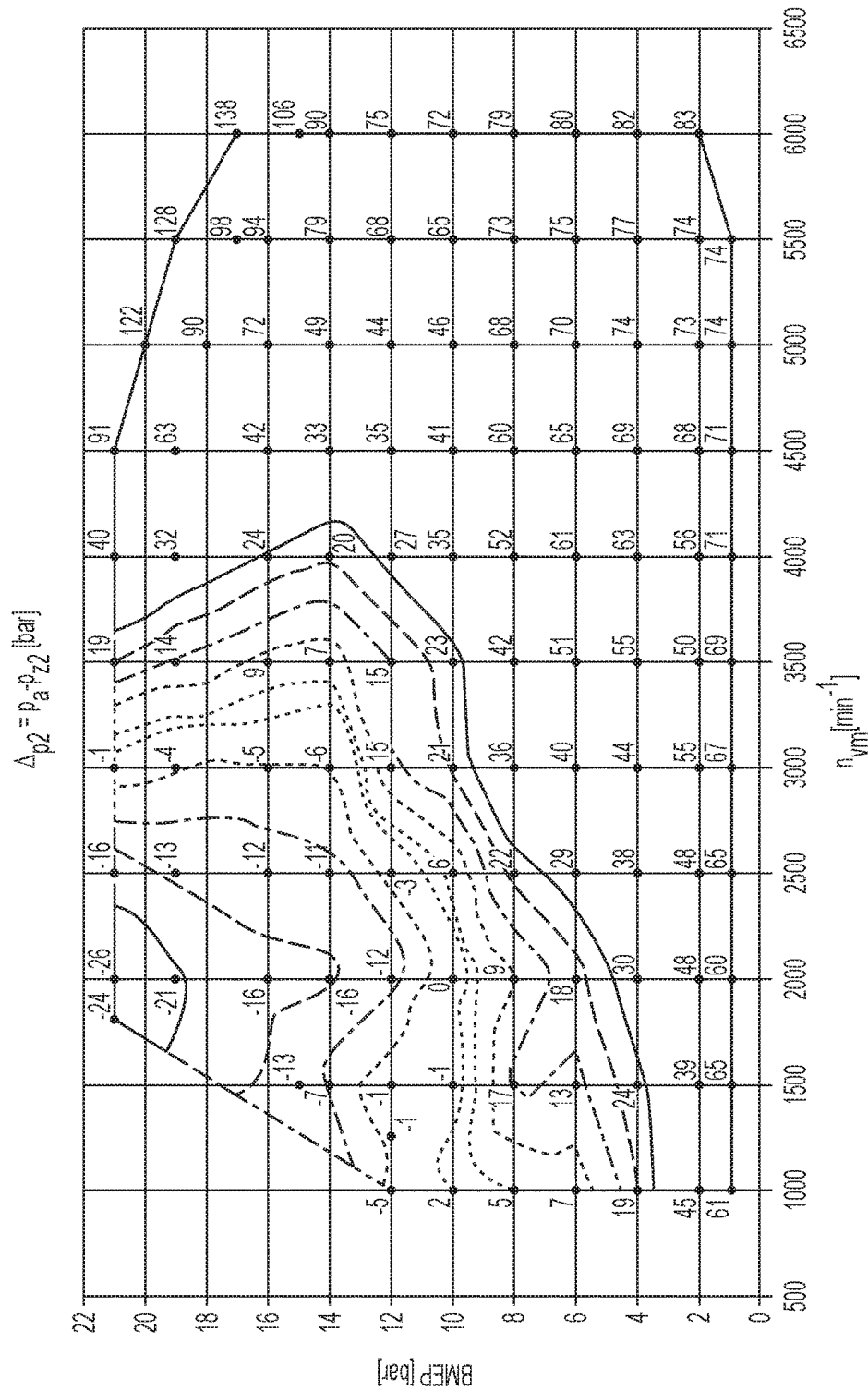
FIG. 2 is a graphic representation of the differential pressure $\Delta p_2$ as a function of the rotational speed of the internal combustion engine and the effective mean pressure.

In FIG. 2, the differential pressure $\Delta p_2$ between the exhaust gas pressure $p_a$ and the second pressure $p_{z2}$ ($\Delta p_2 = p_a - p_{z2}$) as a function of the rotational speed and the effective mean pressure BMEP ("brake mean effective pressure"). The load, with which the internal combustion engine is operated, can be described with the mean pressure BMEP. As already explained above, the exhaust gas pressure $p_a$ is present between the internal combustion engine 12 and the exhaust gas turbine 32 in the discharge line 20, while the second pressure $p_{z2}$ is present in the feed line between the throttle valve 18 and the internal combustion engine 12.

It is evident that in particular at a high load (BMEP>10 bar) and low rotational speeds (<3500 U/min) the differential pressure $\Delta p_2$ is negative, so that no driving pressure gradient from the discharge line 20 to the feed line 16 downstream of the charge air cooler 36 is present here. The pressure differential $\Delta p_2$ becomes positive in particular when the load is reduced (falling BMEP) and/or the rotational speeds are increased. As soon as the pressure differential $\Delta p_2$ becomes positive, the control unit 54 switches the shut-off and directional control device 44 so that a part of the recirculated exhaust gas can flow into the feed line 16 via the second inlet 48 and downstream of the charge air cooler 36. The proportion of the recirculated exhaust gas is adjusted through suitable activation of the regulating valve 42.

Figure 3:
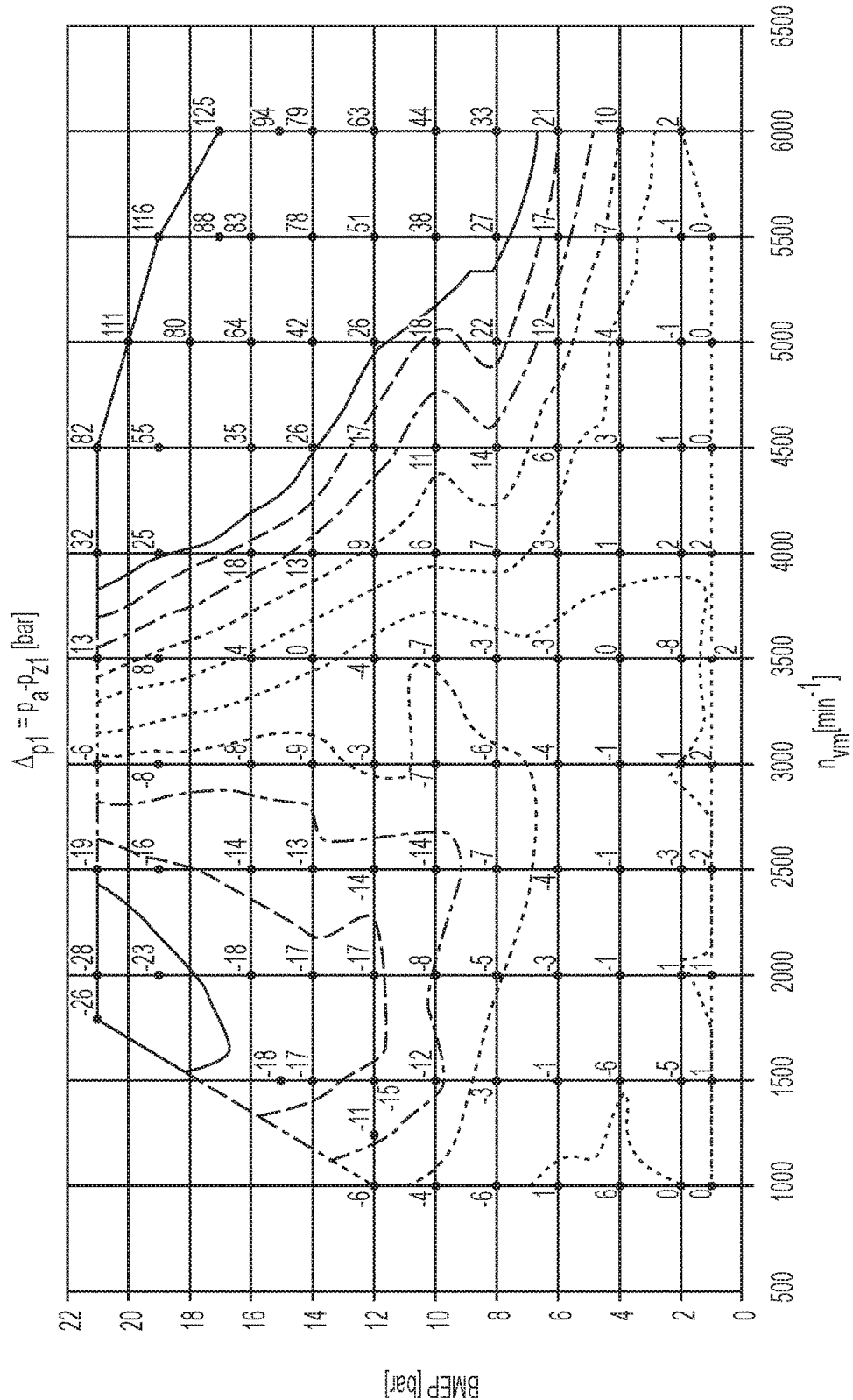
FIG. 3 is a graphic representation of the differential pressure $\Delta p_1$ as a function of the rotational speed of the internal combustion engine and of the effective mean pressure.

In FIG. 3, the pressure differential $\Delta p_1$ between the exhaust gas pressure $p_a$ and the first pressure $p_{z1}$ ($\Delta p_{p1} = p_a - p_{z1}$) is shown as a function of the rotational speed and the BMEP. As already explained above, the exhaust gas pressure $p_a$ is present in the discharge line 20 between the combustion engine 12 and the exhaust gas turbine 32, while the first pressure $p_{z1}$ is present in the feed line 20 between the turbo compressor 30 and the charge air cooler 36. It is evident that from a rotational speed of 3,000 rpm and in particular at a high power output (BMEP>14 bar) the pressure differential $\Delta p_1$ becomes positive. With increasing rotational speeds of the internal combustion engine 12, the pressure differential $\Delta p_1$ becomes positive even at lower effective mean pressures BMEP. As soon as the pressure differential $\Delta p_1$ becomes positive, the control unit 54 switches the shut-off and directional control device 44 so that the recirculated exhaust gases can be introduced into the feed line 16 upstream of the charge air cooler 36 via the first inlet 46.

From FIG. 3 it is evident that the characteristic map range, in which the recirculated exhaust gases are introduced into the feed line 16 upstream of the charge air cooler 36, is relatively small. If the recirculated exhaust gases were to be permanently introduced into the feed line 16 upstream of the charge air cooler 36, a high-pressure exhaust gas recirculation could not be employed at all at rotational speeds below 3,000 rpm. In this regard, the driving device 10 according to the present disclosure makes it possible to employ the high-pressure exhaust gas recirculation in a significantly larger characteristic map range.

Figure 4:
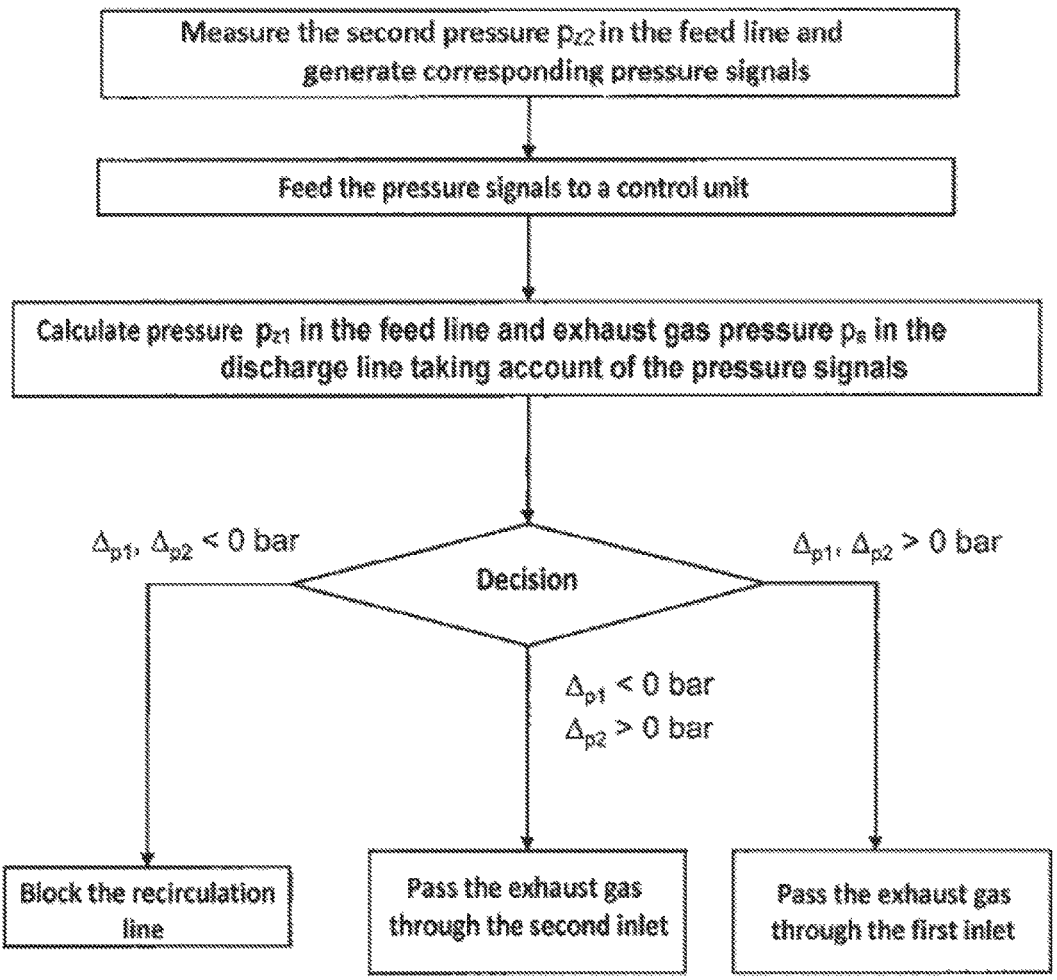
FIG. 4 is a flow diagram of the steps of the method according to the present disclosure and of the computer program according to the present disclosure.

In FIG. 4, the steps of a method according to the present disclosure and of the computer program product according to the present disclosure are shown by way of a flow diagram. In a first step, the second pressure $p_{z2}$ in the feed line 16 is measured by the pressure sensor 50, which generates the pressure signals, which correspond to the measured pressure. In a further step, the pressure signals are fed to the control unit 54. In the step that then follows, the control unit 54 calculates the first pressure $p_{z1}$ and the exhaust gas pressure $p_a$ by way of stored characteristic map lines and from this determines the pressure differentials $\Delta p_1$ and $\Delta p_2$. Depending on the outcome of the pressure differentials, the shut-off and directional control device 44 is activated so that the recirculation line 38 is completely shut off or the exhaust gas is recirculated into the feed line 16 via the bypass line 45 and via the first inlet 48 and through the charge air cooler 36 or via the second inlet 48 bypassing the charge air cooler 36.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A driving device for driving a vehicle, comprising:
   an internal combustion engine;
   a feed line configured to feed combustion air to the internal combustion engine;
   a discharge line configured to discharge exhaust gases from the internal combustion engine;
   a charge air cooler in fluid communication with the feed line and configured to cool the combustion air;
   a recirculation line branching off the discharge line and configured to recirculate exhaust gas from the discharge line into the feed line, wherein exhaust gases can be fed by the recirculation line to the internal combustion engine through the charge air cooler;

a bypass line configured to feed exhaust gas to the internal combustion engine bypassing the charge air cooler, wherein the bypass line is in communication with the recirculation line;

a shut-off and directional control device configured to interact with the recirculation line and the bypass line;

a control unit configured to actuate the shut-off and directional control device such that flow of the recirculated exhaust gas line is: (i) selectively shut off, or (ii) directed through the charge air cooler to the internal combustion engine, or (iii) directed to the internal combustion engine bypassing the charge air cooler; and a status sensor configured to determine a pressure in the feed line and the discharge line of the driving device, wherein the control unit is configured to shut off the recirculation line when the pressure in the feed line is greater than the pressure in the discharge line.

2. The driving device according to claim 1, wherein the shut-off and directional control device comprises an actuating device settable in at least two positions including a first position to direct the recirculated exhaust gas through the charge air cooler to the internal combustion engine and a second position to direct recirculated exhaust gas to the internal combustion engine bypassing the charge air cooler.

3. The driving device according to claim 1, wherein the status sensor device comprises at least one of a pressure sensor arranged in the feed line for measuring pressure in the feed line, or a pressure sensor configured to measure at least one of a pressure in feed line or a pressure in the discharge line, or a mass flow measuring unit configured to measure the mass flow of at least one of the combustion air in the feed line or the exhaust gas in the discharge line, or a tachometer measuring a rotational speed of the internal combustion engine.

4. The driving device according to claim 1, further comprising a flow rate regulating device configured to interact with the recirculation line for adjusting the flow rate of the recirculated exhaust gas.

5. The driving device according to claim 1, further comprising a recirculation cooler that is arranged in the recirculation line for cooling the recirculated exhaust gas.

6. The driving device according to claim 1, further comprising a turbocharger with a turbo compressor in fluid communication with the feed line for compressing the combustion air and an exhaust gas turbine in fluid communication with the discharge line for driving the turbocharger.

7. The driving device according to claim 6, wherein the recirculation line at a first inlet branches into the feed line and the charge air cooler, wherein the turbo compressor seen in flow direction of the combustion air to the internal combustion engine is arranged upstream of the first inlet, wherein the recirculation line branches off the discharge line at a branch-off point, and wherein the exhaust gas turbine is arranged downstream of the branch-off point in flow direction of the exhaust gas away from the internal combustion engine.

8. The driving device according to claim 1, further comprising a throttle valve arranged in the feed line between the charge air cooler and the internal combustion engine, and wherein the bypass line leads into the feed line at a second inlet arranged either between the charge air cooler and the throttle valve or between the throttle valve and the internal combustion engine.

9. A vehicle with a driving device according to claim 1.

10. A method for operating a driving device for driving a vehicle, comprising:

determining a current operational status of the driving device and generating corresponding status signals with a status sensor device;

communicating the status signals to a control unit;

determining at least one of a first pressure in a feed line seen in flow direction of combustion air to an internal combustion engine upstream of a charge air cooler or a second pressure in the feed line downstream of the charge air cooler with the control unit based on the status signals;

determining an exhaust gas pressure in a discharge line with the control unit based on the status signals;

comparing the at least one of the first or second pressures with the exhaust gas pressure; and actuating a shut-off and directional control device using the control unit such that the shut-off and directional control device selectively shuts off the recirculation line when the at least one of the first or second pressures is greater than the exhaust gas pressure.

11. The method for operating a driving device according to claim 10 further comprising:

determining the current operational status of the driving device and generating corresponding status signals with the status sensor device;

communicating the status signals to the control unit;

determining the first pressure in the feed line seen in flow direction of the combustion air to the internal combustion engine upstream of the charge air cooler and a second pressure in the feed line downstream of the charge air cooler based on the status signals;

determining the exhaust gas pressure in the discharge line with the control unit based on the status signals;

comparing the first pressure and the second pressure with the exhaust gas pressure;

actuating the shut-off and directional control device with the control unit such that the shut-off and directional control device: (i) shuts off the recirculation line when the first pressure and the second pressure are greater than the exhaust gas pressure; (ii) recirculates exhaust gas to the internal combustion engine bypassing the charge air cooler when the exhaust gas pressure is greater than the second pressure; or (iii) recirculates exhaust gas through the charge air cooler to the internal combustion engine when the exhaust gas pressure is greater than the first pressure.

12. The method according to claim 10, wherein the current operational status of the driving device is determined by measuring the mass flow of at least one of the combustion air flowing through the feed line or the exhaust gas flowing through the discharge line with a mass flow measuring unit.

13. The method according to claim 10, wherein the current operational status of the driving device is determined by measuring a rotational speed of the internal combustion engine with a tachometer.

14. The method according to claim 10, wherein the current operational status of the driving device is determined by measuring at least the first or second pressure with a pressure sensor suitably arranged in the feed line.

15. A computer program product for operating a driving device with a program code that is stored on a non-transitory computer readable medium for carrying out the method according to claim 10.

\* \* \* \* \*